United States Patent [19]

Satomi

[11] 4,371,255
[45] Feb. 1, 1983

[54] ELECTROPHOTOGRAPHIC COPYING METHOD AND APPARATUS OF RECIPROCAL ORIGINAL SCANNING TYPE

[75] Inventor: Toyokazu Satomi, Yokohama, Japan

[73] Assignee: Ricoh Company, Ltd., Tokyo, Japan

[21] Appl. No.: 211,747

[22] Filed: Dec. 1, 1980

[30] Foreign Application Priority Data

Nov. 30, 1979 [JP] Japan .............................. 54/155837
Dec. 5, 1979 [JP] Japan .............................. 54/157712

[51] Int. Cl.$^3$ ............................................. G03G 15/00
[52] U.S. Cl. .................................... 355/8; 355/14 R;
355/14 SH; 355/3 SH
[58] Field of Search .............. 355/8, 7, 11, 3 R, 14 R,
355/55, 56, 35 H, 14 SH, 13

[56] References Cited

U.S. PATENT DOCUMENTS

| | | | |
|---|---|---|---|
| 3,806,241 | 4/1974 | Gregg et al. | 355/56 X |
| 4,118,118 | 10/1978 | Barto, Jr. | 355/8 |
| 4,126,389 | 11/1978 | Ikeda et al. | 355/8 X |
| 4,211,482 | 7/1980 | Arai et al. | 355/8 |
| 4,236,808 | 12/1980 | Tusso et al. | 355/8 |
| 4,260,241 | 4/1981 | Honma et al. | 355/14 R |

Primary Examiner—A. C. Prescott
Attorney, Agent, or Firm—Guy W. Shoup; Gerard F. Dunne

[57] ABSTRACT

The surface of a photoconductor is moved in a predetermined direction and the original is scanned reciprocally by the relative movement of an optical system relative to the original. The photoconductor is exposed not only at the forward original scanning, but also at the backward original scanning through an exposure optical path which is different from that at the forward original scanning. The relative shifting of the original and the optical system is performed regardless of the size of the original and can be always performed in the full area in the scanning direction for the maximum size original, and the shift distance can be changed depending upon the size of the original. The original is placed on an original stacking surface in conformity with the two references in the scanning direction and in the transverse direction by use of the two end edge portions. For making copies from originals other than the maximum size original and locating the copy image at the proper position in the recording sheet, there is provided a position adjustment device for adjusting the relative positions of the copy image and the recording sheet in the recording position with respect to the longitudinal direction. This position adjustment device is operated selectively in conjunction with the forward and backward scannings of the optical system. With respect to the transverse direction, the relative positions of the copy image and the recording sheet in the recording position are adjusted by the shifting of the image formation lens system or the recording sheet in the transverse direction.

24 Claims, 21 Drawing Figures

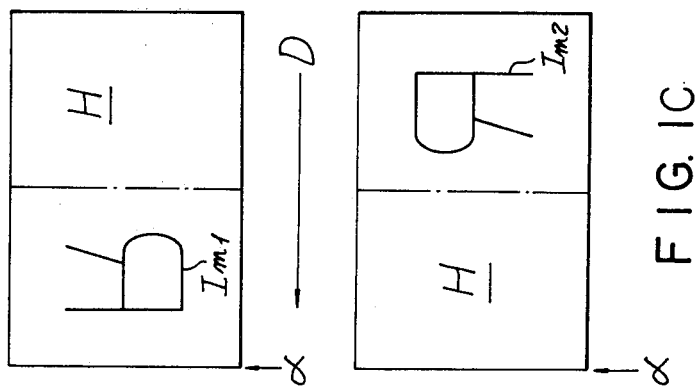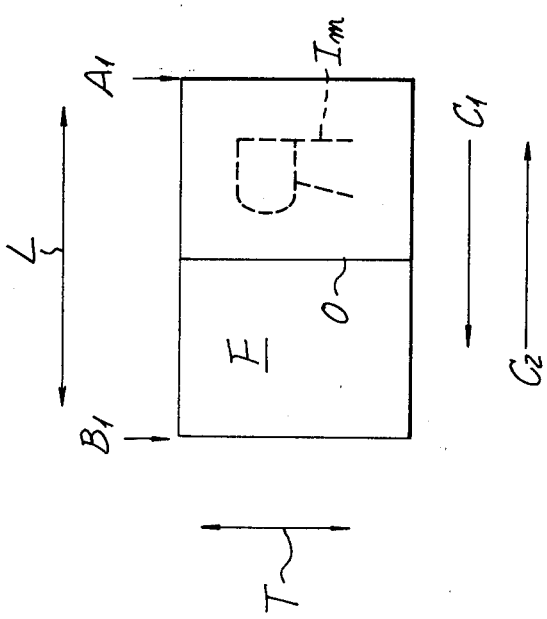

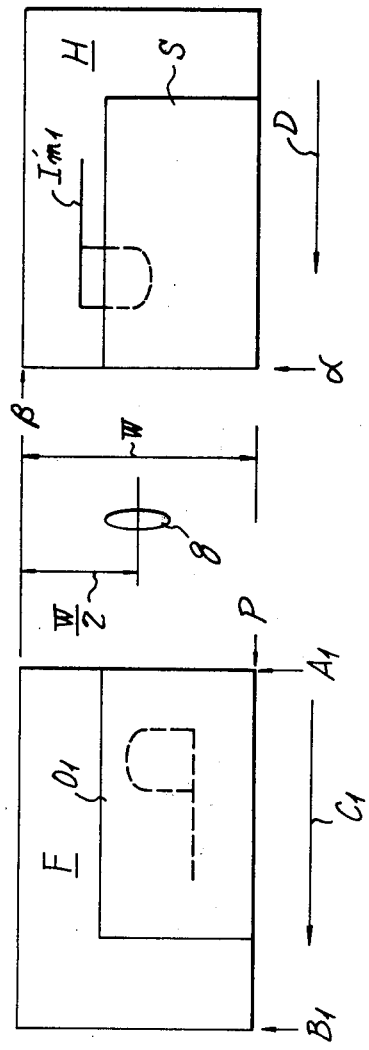
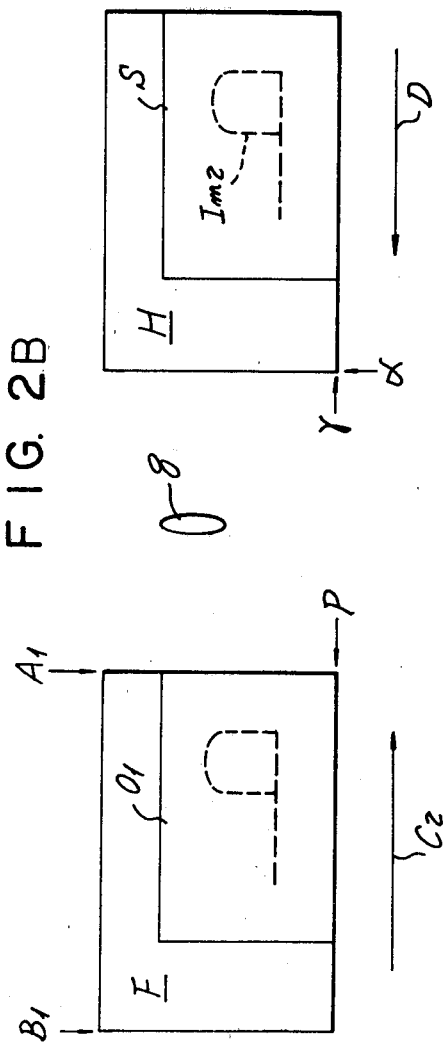
FIG. 2A
FIG. 2B

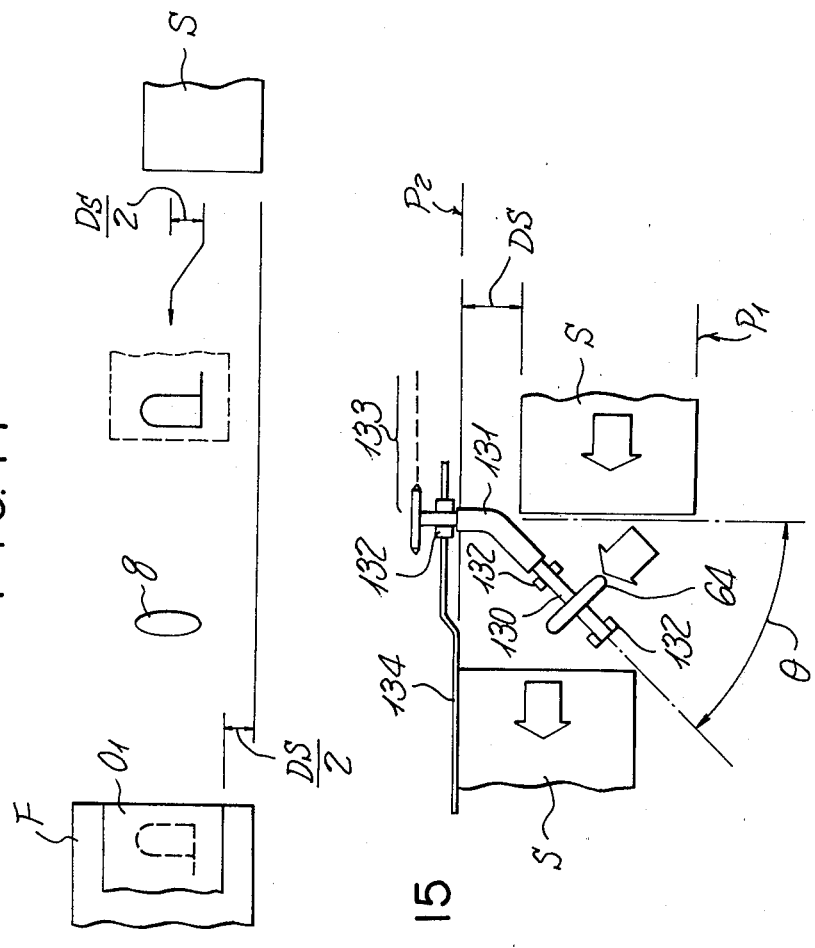

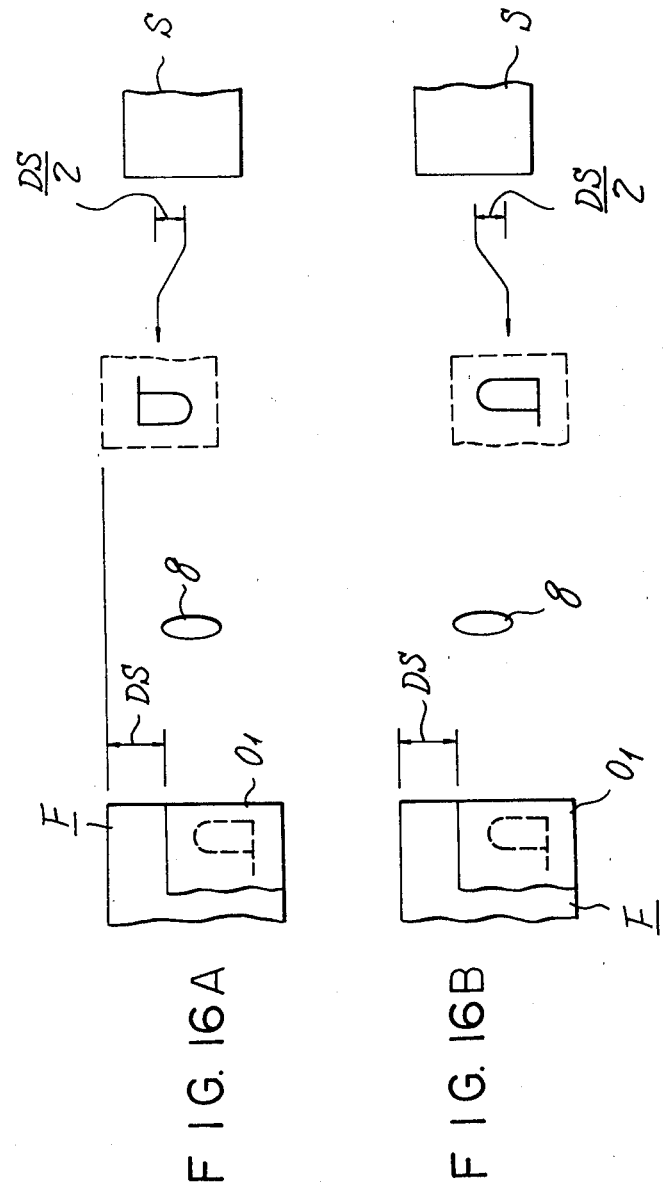

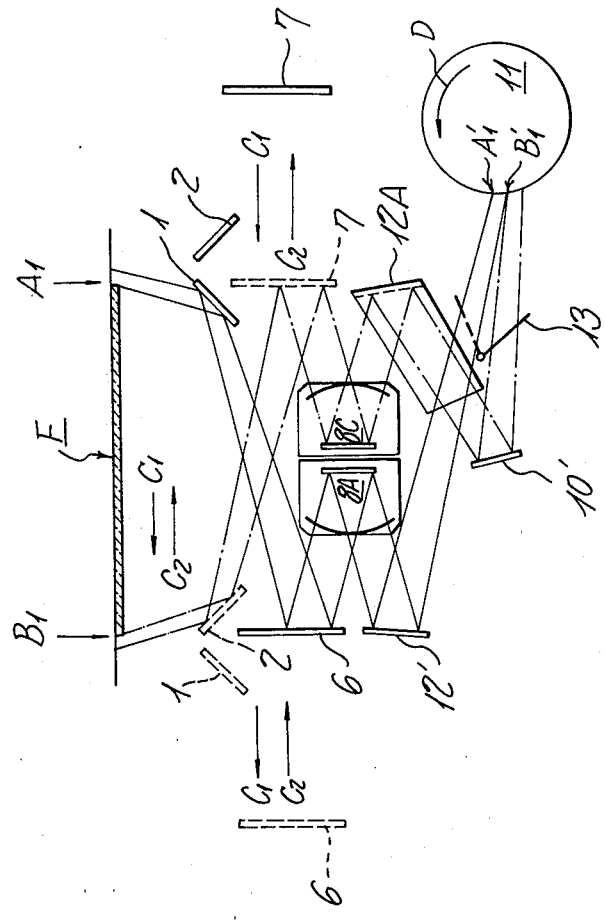

ELECTROPHOTOGRAPHIC COPYING METHOD AND APPARATUS OF RECIPROCAL ORIGINAL SCANNING TYPE

BACKGROUND OF THE INVENTION

The present invention relates to a method for reciprocally scanning an original and an apparatus therefor.

Conventionally, there is known a copying method in which original and an exposure optical system are moved relative to each other for performing reciprocal scanning of the original, while at the same time the surface of a photoconductor is moved in a predetermined direction, whereby the optical image of the original is projected onto the photoconductor through different optical paths during the forward scanning and the backward scanning. For example, see Japanese Laid-open patent application Ser. No. 54-070,047.

By the above-mentioned copying method, the copying efficiency can be maximized.

In the case of the above-mentioned copying method, there will be little problems so long as an original scanned is the maximum size that can be copied by the copying machine. However, when an original of a smaller size than maximum is employed, there are several problems, as will now be explained.

Before discussing such problems, however, the longitudinal direction and the transverse direction of copying in the above-mentioned copying method are defined for the sake of convenience of explanation as follows: The longitudinal direction is the direction parallel to the original scanning direction, which is also parallel to the movement direction of the optical image of the original in the exposure section. Furthermore, the original scanning direction is parallel to the movement direction of the surface of the photoconductor and to the transportation direction of the recording sheets. Therefore, not only the original scanning direction, but also the movement direction of the optical image of the original, the movement direction of the surface of the photoconductor and the transportation direction of the recording sheets, are longitudinal.

The transverse direction is the direction normal to the longitudinal direction. Therefore, the transverse direction exists on the surface of the original to be scanned. As in the case of the longitudinal direction, with respect to the movement direction of the surface of the photoconductor and the movement direction of recording sheets, there exist respective transverse directions. In those cases, those transverse directions exist on the surface of the photoconductor and on the surface of each recording sheet.

In this specification, the term recording sheet is used to collectively cover photosensitized sheets for use in direct copying processes, such as the electrofax process, and image transfer sheets for use in a visible image transfer process or in an electrostatic latent image transfer process.

Throughout this specification, when it is unnecessary to distinguish the photosensitized sheet from the image transfer sheet, the term "recording" will be used, while when it is necessary to distinguish them, the the words "photosensitized sheet" and "image transfer sheet" are separately used.

In the aforementioned original reciprocating scanning method, the original is scanned in opposite directions, i.e., by a forward movement and by backward movement: In contrast to this, the movement direction of the surface of the photoconductor is constant. Therefore, in order to achieve the proper exposure of the photoconductor regardless of the original scanning direction, an in-prism lens or a roof mirror has to be disposed in one of the two optical paths for exposure for the forward scanning use and the backward scanning use. Hereinafter, the optical path for exposure employing the in-prism lens or the roof mirror is referred to as a roof type optical path.

Furthermore, together with the above-mentioned definition of the recording sheet, the term photoconductor covers a photoconductor sheet in this specification.

Referring to FIG. 1A, reference symbol F designates an original stacking surface. The size of the original stacking surface is equal to the maximum size of the original that can be copied. Reference symbol L designates the longitudinal direction, and symbol T the transverse direction. For the sake of convenience of explanation, the following copying system is assumed. The photoconductor is formed in the shape of a drum and is rotated in a predetermined direction and is exposed during the forward original scanning. An electrostatic latent image formed on the surface of the photoconductor by the exposure is developed to form a visible image. That visible image is transferred from the surface of the photoconductor to a recording sheet. Further for convenience of explanation, the peripheral length of the drum-shaped photoconductor (hereinafter referred to as the photoconductor drum) is equal to the length of the original stacking surface in the longitudinal direction thereof, and the forward original scanning is performed from an end $A_1$ to an end $B_1$ of the original stacking surface. Upon the completion of the forward original scanning, the backward original scanning is performed in the direction opposite to the forward original scanning. In FIG. 1A, arrows $C_1$ and $C_2$ respectively designate the forward original scanning direction and the backward original scanning direction.

Furthermore, in FIG. 1A, reference symbol H designates the developed surface of the photoconductor surface, and symbol D designates the movement direction of the surface of the photoconductor drum.

As shown in FIG. 1B, it is assumed that a small original O is placed on the original stacking surface F. In FIG. 1B, the back side of the original O can be seen and, on the front side of the original O, an image $I_m$ is formed. When the forward original scanning is performed under this condition and the photoconductor drum is exposed to the optical image of the original O, the end $A_1$, which is the initiation line of the forward original scanning, corresponds to the exposure initiation line $\alpha$ of the photoconductor drum. Therefore, when an electrostatic image thus formed is developed, a visible image $I_{m1}$ is formed on the surface H of the photoconductor drum on the side of the exposure initiation point R on the developed surface of the drum. When the forward original scanning is successively performed, the end $B_1$, which constitutes the initiation point of the backward original scanning, corresponds to the exposure initiation point $\alpha$. Therefore a visible image $I_{m2}$ is formed on the opposite side with respect to the exposure initiation point $\alpha$. The visible images $I_{m1}$ and $I_{m2}$ are transferred to the recording sheet.

However, the positions of those images are different on the surface of the photoconductor drum. Therefore, if the visible image $I_{m2}$ is transferred to the recording sheet with the same timing as that of the visible image $I_{m1}$, the image transfer would not be performed properly. That is, when the recording sheet and the original are the same size, the visible image $I_{m2}$ and the recording sheet are in completely different positions. As a result, the visible image $I_{m2}$ cannot be transferred to the recording sheet at all.

Thus, in the case where the exposure of the photoconductor drum is performed during the backward original scanning and the original is not the maximum original, it is required that the recording position of the copy image and the position of the recording sheet be suitably adjusted.

The case where an original O, which is smaller than the maximum size original in the transverse direction, is placed on the original stacking surface $F_1$ as shown in FIGS. 2A and 2B will now be discussed, using the above-mentioned copying system. In the following description, it is assumed that the copy image and the recording sheet are properly adjusted with respect to their position.

In FIGS. 2A and 2B, reference numeral 8 designates an image formation lens system. For the sake of convenience of explanation, it is assumed that the image formation lens system 8 is a through-lens. The image formation lens system 8 is shared by the forward original scanning optical path and the backward original scanning path. The backward original scanning path is a roof-type optical path.

When the forward original scanning is performed in the direction of arrow $C_1$ under the conditions as shown in FIG. 2A, the end portion $A_1$ in the longitudinal direction on the original stacking surface F and the end portion P in the transverse direction thereof correspond to an exposure initiation point $\alpha$ and a side end portion $\beta$ on the surface of the photoconductor. Therefore, the visible image $I'_{m1}$ corresponding to an image $I_{m'}$ on the original $O_1$ is formed as shown in FIG. 2A, and when a recording sheet S is transported in the transverse direction with the end side P as its transportation reference, the position of the visible image $I'_{m1}$ and that of the recording sheet S, become different as shown in FIG. 2A. As a result, the visible image $I'_{m1}$ is not properly transferred to the recording sheet S and part of the visible image $I_{m'}$ remains untransferred.

In contrast to this, when the backward original scanning is performed as shown in FIG. 2B, since the optical path is of a roof type, the end portion P in the trasverse direction on the original stacking surface F corresponds to an end portion $\gamma$ in the transverse direction on the surface H of the photoconductor drum.

Therefore, a visible image $I_{m2}$ is formed in the position shown in FIG. 2B, so that the positional relationship between the visible image $I_{m2}$ and the recording sheet S is properly set in the transverse direction, whereby the proper transfer of the visible image is performed. Thus, in the copying system of the type where the exposure of the photoconductor is performed during the forward original scanning, it is required that the positional relationship between the copy image and the recording sheet be adjusted in the transverse direction as well with respect to the recording position, when copies are made from an original other than the maximum size original.

Therefore, such necessity for adjustment of the positional relationship between the copy image and the recording sheet is a problem to be solved in the conventional copying system.

In this specification, when the recording sheet is a photosensitized sheet, the term "recording position" means the position where exposure is done, while, when the recording sheet is an image transfer sheet, it means the position where an electrostatic latent image or a visible image is transferred to the the image transfer sheet.

As regards the improper positional relationship between the image to be copied and the recording sheet in the longitudinal direction and the transverse direction, the improper positional relatinship in the transverse direction can be solved by the following procedure: When copies are made from originals except the maximum size original, a smaller original is placed on the original stacking surface in such a manner that the center of the original in the transverse direction is positioned in conformtity with the center of the original stacking surface in the transverse direction thereof, and the recording sheet corresponding to that original is transported in such a manner that the center of the recording sheet in the transverse direction is positioned in the center of the copying machine in the transverse direction thereof. The above-mentioned original stacking method and the recording sheet transporation are respectively referred to as the center-reference original stacking and the center-reference recording sheet transportation.

In contrast to this, an original stacking method in which the original is placed on the original stacking surface in such a manner that one side portion of the original is in conformity with one side of the original stacking surface in the transverse direction thereof is referred to as one-side-reference original stacking. A recording sheet transportation method in which the recording sheet is transported, using one side portion in the transverse direction, is referred to as one-side-reference recording sheet transportation.

The copying method shown in FIGS. 2A and 2B is of one-side-reference original stacking and one-side-reference recording sheet transportation, and their reference is one and the same and is located on side P.

In center-reference original stacking and the center-reference recording sheet transportation, the exposure is performed in the same central portion in the transverse direction during both the forward scanning and the backward scanning, regardless of the size of original. Therefore, there is no shift between the original optical image and the recording sheet in the recording position, so that the previously mentioned problems do not take place.

However, when a copying apparatus of the forward-and-backward-original-scanning type is designed in practice, the center-reference original stacking and the center-reference recording sheet transportation are not always adopted in combination. There may be a case where the one-side reference original stacking and the center reference recording sheet transportation have to be adopted in combination or there may be a case where the one-side-reference original stacking and the one-side-reference recording sheet transportation have to be adopted in combination. In any of these combinations, the above-mentioned problems take place.

SUMMARY OF THE INVENTION

It is therefore an object of the invention to provide a copying method capable of adjusting the positional relationship between the optical original image and the recording sheet in the longitudinal direction thereof, in a copying method in which the original is subjected to reciprocal exposure scanning.

Another object of the invention is to provide a copying apparatus for performing the copying method of the type described.

A further object of the invention is to provide a copying method capable of adjusting the positional relationship between the optical original image and the recording sheet in the transverse direction thereof in the copying method of the type described.

A still further object of the invention is to provide a copying apparatus for performing the copying method of the type described which is capable of adjusting the positional relationship between the optical original image and the recording sheet in the transverse direction.

Other objects and features of the invention will be become apparent from the following explanation.

These objects of the invention are attained as follows:

With respect to the longitudinal direction, there is provided a positional relationship adjustment means for adjusting the positional relationship between the copy image and the recording sheet in the recording position, and the positional relationship adjustment means is selectively operated by the forward original scanning, which scanning is attained by the relative movement of the optical system and the original. For example, in the copying system for transferring a visible image or an electrostatic latent image from the photoconductor to an image transfer sheet, the positional relationship adjustment means is a control mechanism for controlling the timing of feeding the transfer sheet or the timing of the exposure, which is capable of adjusting the positional relationship between the copy image and the recording sheet by controlling any of the above-mentioned timings, depending upon the forward original scanning and upon the backward original scanning. In the case of the direct copying method, the positional relationship adjustment means is a mechanism for controlling the timing of exposure or the timing of the feeding of photosensitive sheets.

With respect to the transverse direction, there is provided a movement means for moving an image formation lens system or a recording sheet in the transverse direction, and by the movement of the image formation lens system or the recording sheet, the positional relationship between the copy image and the recording sheet in the transverse direction is adjusted.

Thus, according to the invention, copying can be performed with high efficiency and, furthermore, the copy image can be located at the proper position on the recording sheet, regardless of the size of original.

BRIEF DESCRIPTION OF THE DRAWINGS

FIGS. 1A, 1B and 1C are diagrams in explanation of the positional shift of a copy image and a recording sheet in the longitudinal direction to point out a problem to be solved by the invention.

FIGS. 2A and 2B are diagrams in explanation of the positional shift of a copy image and a recording sheet in the transverse direction to point out another problem to be solved by the invention.

FIG. 14 is a diagram in explanation of the movement of a recording sheet in the transverse direction.

FIG. 15 is a diagram in explanation of a mechanism for moving a recording sheet in the transverse direction.

FIGS. 16A and 16B are diagrams in explanation of the movement of a recording sheet in the transverse direction.

FIG. 17 is a diagrammatical sectional view of another copying apparatus to which the invention can be applied.

DESCRIPTION OF EMBODIMENTS

Figure 3:
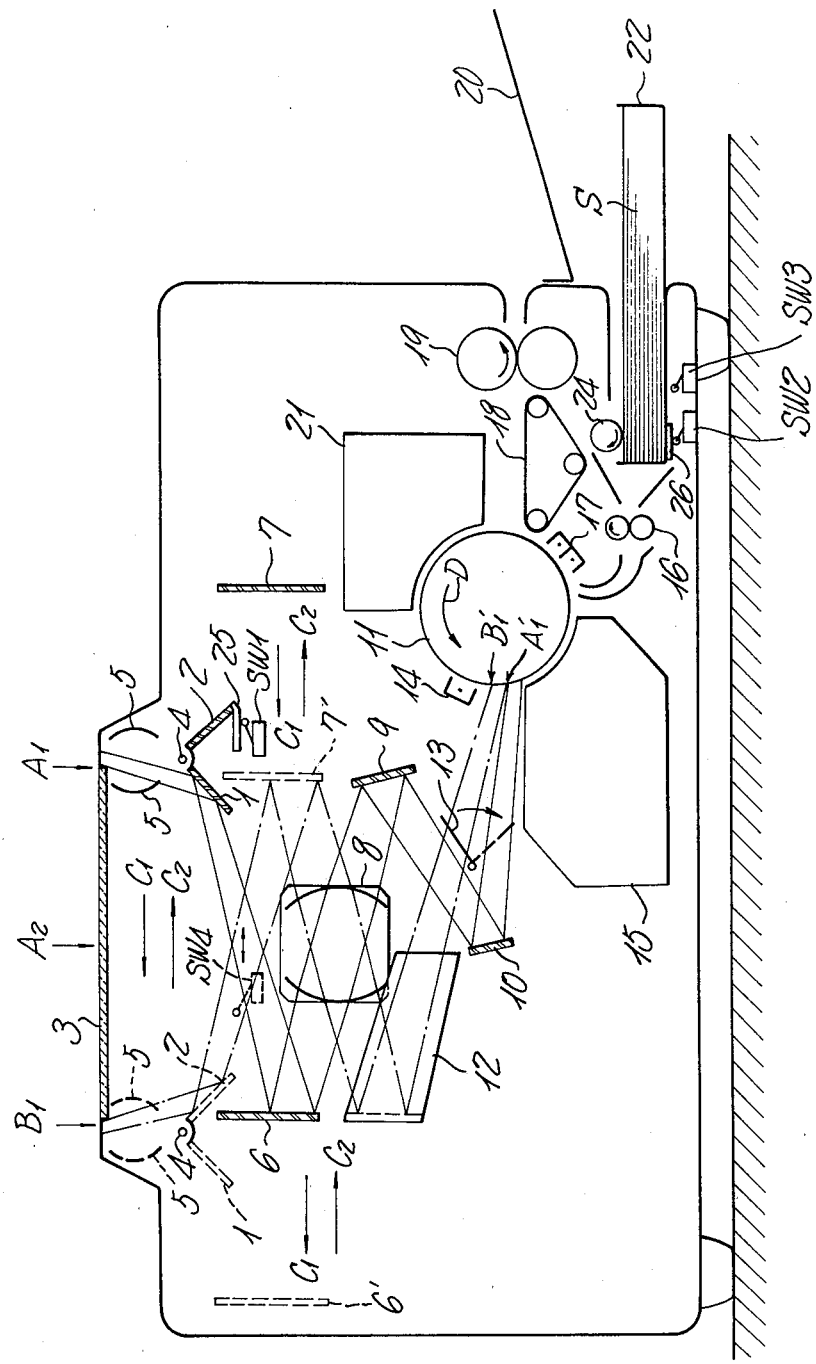
FIG. 3 is a diagrammatical sectional view of an embodiment of a copying apparatus according to the invention.

Referring to FIG. 3, plane mirrors 1 and 2 are each disposed at an angle of 45° with respect to a contact glass 3 for placing an original thereon, and the two mirrors 1 and 2 are positioned at a right angle in terms of their relative positions. Between the contact glass 3 and the plane mirrors 1 and 2, there are disposed a light source 4 and a pair of reflectors 5 through an exposure optical path. Light emitted from the light source 4 is condensed on the contact glass 3. The upper surface of the contact glass 3 constitutes the original stacking surface designated by reference symbol F in FIG. 1A. In FIG. 3, the direction from left to right is the longitudinal direction, while the direction normal to the plane of the drawing is the transverse direction. In FIG. 3, reference symbols $A_1$ and $B_1$ designate the opposite end portions of the original stacking surface in the longitudinal direction as in FIG. 1A.

The plane mirrors 1 and 2, the light source 4 and the reflectors 5 are fixed to a carriage (not shown) and are movable in the direction parallel to the contact glass 3, reciprocally in the longitudinal direction. When those members are moved in the direction of arrow $C_1$, the forward original scanning is performed, while when those members are moved in the direction of arrow $C_2$, the backward original scanning is performed.

Plane mirrors 6 and 7 are disposed in such a manner that their reflecting surfaces face each other, and those reflecting surfaces are positioned normal to the contact glass 3 and parallel to the transverse direction. The plane mirrors 6 and 7 are supported on a carriage (not shown) and when the mirrors 1 and 2 are moved in the direction of the arrow $C_1$, the mirrors 6 and 7 are also moved in the same direction, while when the mirrors 1 and 2 are moved in the direction of the arrow $C_2$, the mirrors 6 and 7 are also moved in the direction of the arrow $C_2$. However, the movement speed of the mirrors 6 and 7 is always one-half of the movement speed of the mirrors 1 and 2.

The mirrors 1 and 6, the image formation lens system 8 and plane mirrors 9 and 10 constitute an exposure optical path for the forward original scanning. This exposure optical path extends from the original stacking surface to the peripheral surface of a photoconductor 11. The photoconductor 11 is formed in the shape of a drum and is rotated in the direction of arrow D. The rays of image formation light which pass through the exposure optical path for the inward original scanning are indicated by the solid lines. Under the conditions shown in FIG. 3, a position A on the original stacking surface corresponds to the position A' on the peripheral surface of the photoconductor 11. At the forward original scanning, the mirrors 1 and 2, light source 4, reflectors 5 and mirrors 6 and 7 are respectively moved to the positions indicated by the broken lines. On the other hand, the image formation lens system 8 and mirrors 9 and 10 are stationary in the copying apparatus.

The mirror 2, mirror 7, image formation lens system 8 and a roof mirror 12 constitute an exposure optical path for the backward original scanning. At the backward original scanning, the movable members in the exposure optical system are respectively moved from the positions indicated by the broken lines to the positions indicated by the solid lines. The rays of light which pass through the exposure optical path for the backward original scanning are indicated by the alternate long-and-short lines and, under the conditions shown in FIG. 3, a position $B_1$ on the original stacking surface corresponds to the position $B'_1$ on the peripheral surface of the photoconductor 11.

Between the exposure optical path for the forward original scanning and the exposure optical path for the backward original scanning, there is disposed a light shielding plate 13 for switching the exposure optical path, from one to the other. Light shielding plate 13 is swung to accomplish said switching of the exposure optical path, closing the exposure optical path for the backward original scanning during the forward original scanning, and closing the exposure optical path for the forward original scanning during the backward original scanning.

The roof mirror 12 comprises a pair of plate mirrors disposed so as to face each other at a right angle (90°) in the shape of a peaked roof, and the edge lines of the mirrors are parallel to the plane of the drawing. The roof mirror 12 is stationary in the copying apparatus.

The photoconductor 11 which is rotated in the direction of the arrow D is charged uniformly by a charger 14 and an electrostatic latent image is formed on the surface of the photoconductor 11 by the aforementioned exposure optical system. The electrostatic latent image is developed to a visible image by a development apparatus 15. The formed visible image is transferred image is transferred by an image transfer charger 17 to a transfer sheet fed from registration rollers 16. The transfer sheet to which the visible image has been transferred is transported by a transportation belt 18 and the visible image is fixed to the sheet by an image fixing apparatus 19. The sheet is then discharged onto a tray 20.

After the image transfer, the photoconductor 21 is cleaned by a cleaning apparatus 11 and is ready for the next copying.

The transfer sheets S placed in a cassette 22 are individually transported into the registration rollers 16 by sheet feeding rollers 24. The rollers 16 are connected to a drive portion (not shown) which is normally rotated in a predetermined direction. When the leading edge of the transfer sheet S is pinched by the rollers 16 and the rollers 16 are temporarilly stopped by a clutch means (not shown) connected the drive portion, the sheet S stays there temporarily and waits for a timing signal at which the sheet S and the position of the image on the surface of the photoconductor 11 come into conformity with each other, and, with the proper timing, the feeding of the sheet S is resumed by the rotation of the clutch.

A cam plate 25 is supported by the aforementioned carriage for moving the plane mirrors 1 and 2 and actuates a switch SW1 when the optical system is at the positions indicated by the solid line. The switch SW1 detects whether or not the optical system is located on the side $A_1$ of the original stacking reference position. When the switch SW1 is on, the optical system is located at the position indicated by the solid lines and is in the standby position before initiating the forward original scanning in the direction of the arrow $C_1$. At this moment, the light shielding plate 13 is at the position shown by the solid line, closing the exposure optical path for the backward scanning.

A projection 26 is part of the cassette 22 and has the function of actuating a switch SW2. Another cassette for holding transfer sheets different in size from the transfer sheets S in the cassette 22 would have such a projection at a different position. Therefore, when such other cassette is mounted, a switch SW3 would be actuated by the projection. The switches SW2 and SW3 are for detecting the size of the transfer sheets S and control the timing of the return of the optical system for scanning and also control the timing of the initiation of the rotation of the registration rollers 16.

When the optical system initiates the backward original scanning after completion of the forward original scanning, the switch SW1 is off, and the light shielding plate 13 has been moved to the position indicated by the broken lines, closing the exposure optical path for the forward original scanning.

The image formation position on the photoconductor 11 by the forward exposure optical system and that by the backward exposure optical system are shifted to correspond with each other, and by the period of time corresponding to the distance of the shift, the timing of the initiation of the rotation of the registration rollers 16 is delayed at the backward exposure. When the image formation positions of both exposure scanning paths for the forward original scanning and the backward scanning are identical on the photoconductor 11, it is unnecessary to delay the initiation of the rotation of the rollers 16 at the backward original scanning, but only the switching of the light shielding plate 13 is necessary.

In the above, the case where the size of the original is equal to the maximum size of the original that can be copied has been explained. However, in the case where an original is smaller than the maximum size, for instance, when the size is one-half of the maximum size and such an original is placed on the contact glass 3, with one end of the original in conformity with point $A_1$, the other end of the original is at point $A_2$, so that $\overline{A_1B_1} = \frac{1}{2}\overline{A_1A_2}$. When such a half-size original is exposed, since the scanning initiation point $A_1$ for the forward original scanning is the same, irrespective of the size of the original, there is no problem. However, at the backward original scanning, if the scanning is started from the point $B_1$, no original exists in the area between the point $B_1$ and the point $A_2$ and therefore, if the registration rollers 16 are rotated with the same timing as the timing in the case of copying the maximum size original, no image is transferred from the photoconductor 11 to the transfer sheet S.

The present embodiment of a copying apparatus according to the invention has successfully eliminated the above-mentioned shortcoming. In this embodiment, by the switches SW1 and SW2, or by the switches SW1 and SW3, the position of the optical system and the size of the transfer sheet S are detected and, when a copy is made of the half-size original, the initiation of the rotation of the rollers 16 is delayed by the period of time corresponding to the length of $\overline{B_1A_2}$ at the backward original scanning. In this embodiment, only one cassette can be mounted. However, when the copying machine is designed so as to be capable of mounting a plurality of cassettes thereon, or when it is designed so as to be capable of using the transfer sheet S with the desired size by cutting a roll sheet, an electric circuit capable of detecting the size of the transfer sheet and the position of the optical system is constructed of a transfer sheet size selection switch and the switch SW1. Alternatively, a switch SW4, which can be continuously moved in accordance with the length of the original, is disposed at the position $A_2$ near the contact glass 3, and by use of the switch SW4 and the switch SW1, the position of the optical system is detected. As mentioned previously, when the image formation position on the photoconductor 11 at the forward original scanning is shifted from that at the backward original scanning, the initiation of the rotation of the rollers 16 is delayed by the period of time corresponding to the sum of the shifted distance and the length $\overline{B_1A_2}$.

Thus, small size originals, such as the half-size original, can be properly copied in exactly the same manner during the backward original scanning with a copying speed the same as that in the case of making copies from the maximum size original.

In this embodiment, when originals smaller than the maximum size original are copied, each original is scanned over its full length during the forward original scanning by the optical system, and the optical system is stopped there, and then the backward original scanning is started, without performing unnecessary scanning in the area where the original is not present, whereby the total copying time is reduced. This is referred to as the short return of the optical system. By this short return, the copying time of the half-size original can be reduced almost to one half of the copying time of the full size original. This can be achieved by use of the switches SW1 and SW2 or by the switches SW1 and SW3. When it is assumed that the switch SW3 is a switch for detecting the cassette for the half-size transfer sheets and that the forward original scanning is started under the conditions that both the switches SW1 and SW3 are on, a timer counts the period of time from the start of the forward original scanning through the detection by the switch SW3, which period of time corresponds to the length of the transfer sheet, and after that period of time has elapsed, the forward original scanning is stopped and the scanning is switched over to the backward original scanning. The setting of the timing of the switching in the timer can be performed by the transfer sheet size selection switch disposed in an operation panel of the copying apparatus other than the cassette detection switch. Furthermore, the switching from the forward original scanning to the backward original scanning can be performed by selecting one of a plurality of switches disposed near the contact glass 3, depending upon the size of the original, and by actuating the selected switch by the cam plate 25. Furthermore, the switching from the forward original scanning to the backward original scanning can be performed by the switch SW4 which is actuated by the cam plate 25 and is moved in accordance with the length of the original.

The timing of the initiation of the rotation of the registration rollers 16 at the backward original scanning in the above-mentioned case is the same as that at the scanning of the full-size original and the rotation of the rollers 16 is delayed at the backward scanning by the period of time corresponding to the shift of the image formation position on the photoconductor 11, which image formation position differs in the forward scanning and in the backward scanning.

Figure 4:
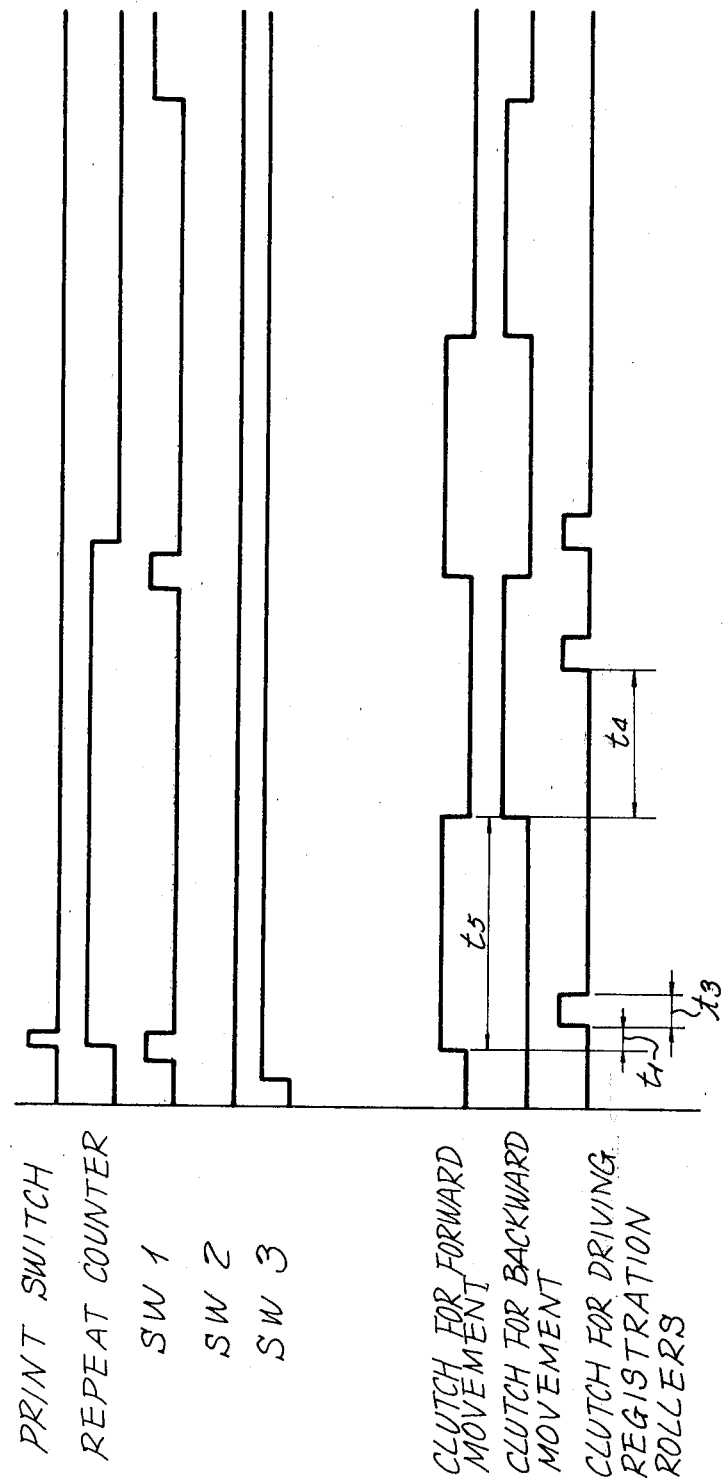
FIG. 4 is a timing chart showing the operation of the copying apparatus shown in FIG. 3.

Referring to FIG. 4, there is shown the time chart for copying a half-size original on three half-size transfer sheets successively. The period of time from the start of the scanning by the optical system to the energization of the clutch for driving the registration rollers 16 at the forward scanning $t_1$ is different from that at the backward scanning $t_4$ ($t_2$ in the case of a full-size original).

Figure 5:
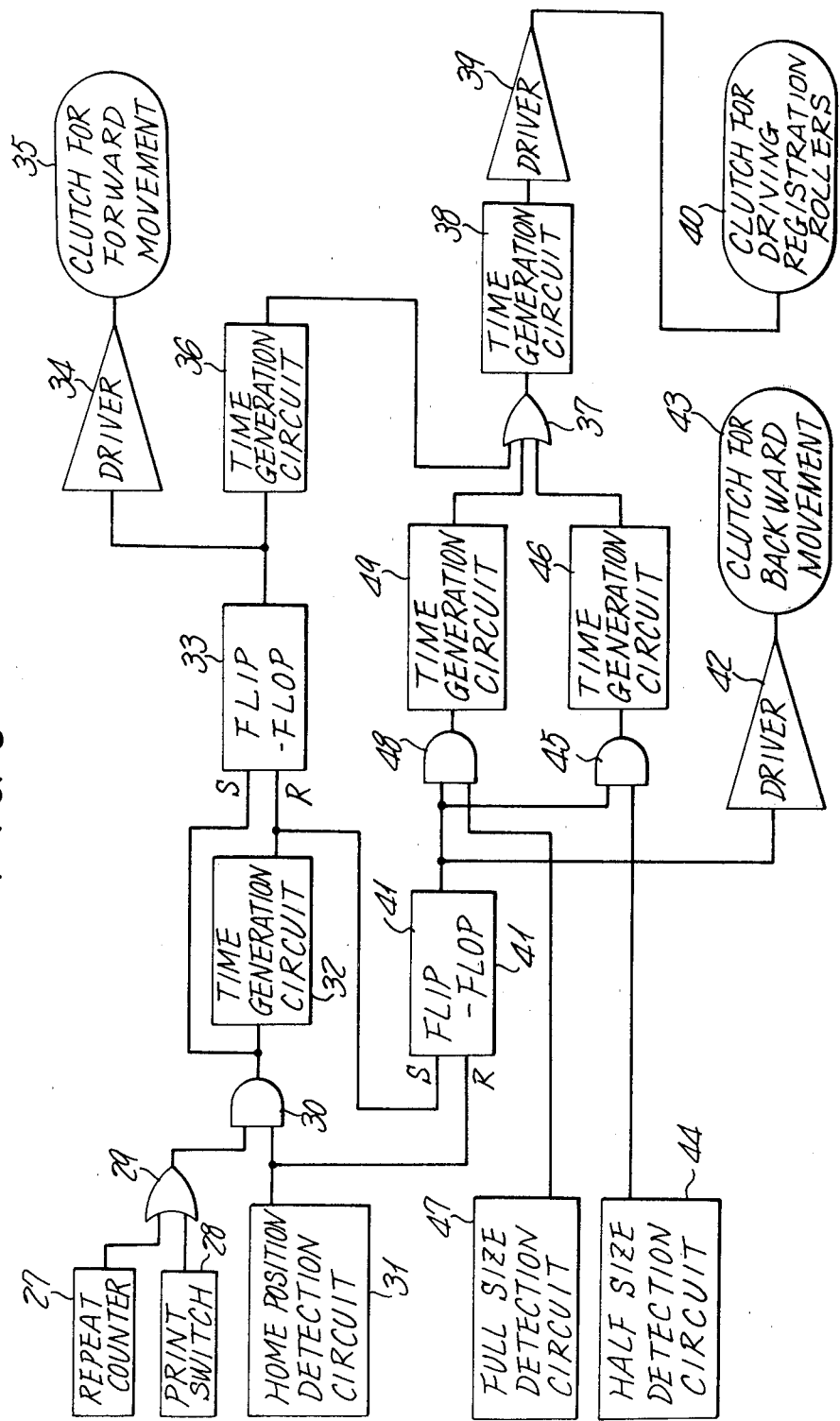
FIG. 5 is a block diagram of the electric circuit for performing the operation shown in FIG. 4.

Referring to FIG. 5, there is shown a diagram of the electric circuit which performs the operation shown in FIG. 4. The output signals from a repeat counter 27 and from a print switch 28 are input to an AND circuit 30 through an OR circuit 29. The output signal from a home position detection circuit 31 employing the switch SW1 is input to the AND circuit 30. A time generation circuit 32 is triggered by the leading edge of the output signal of the AND circuit 30 to produce an output signal with a time width $t_5$. A flip-flop 33 is set by the leading edge of the output signal from the AND circuit 30 and is reset by the trailing edge of the output signal from the time generation circuit 32. A driver 34 drives a clutch 35 for the forward scanning in accordance with the output signal from the flip-flop 33, whereby the optical system is moved in the direction of the arrow $C_1$. A time generation circuit 36 is triggered by the leading edge of the output signal of the flip-flop 33 to produce an output signal with a time width $T_1$. This output signal is input to a time generation circuit 38 through an OR circuit 37. The time generation circuit 38 is triggered by the input signal applied thereto to produce an output signal with a time width $t_3$. By this output signal, a driver 39 energizes a clutch 40 for driving the registration rollers 16 to rotate them. In the meantime, when a flip-flop 41 is set by the trailing edge of the output signal from the time generation circuit 32 and is reset by the output signal from the home position detection circuit 31. A driver 42 drives a clutch 43 for the backward original scanning in accordance with the output signal from the flip-flop 41, so that the optical system is moved in the direction of the arrow $C_2$. When the transfer sheet is of a half-size, by the output signal of a half-size detection circuit 44 employing the switch SW3, the output signal of the flip-flop 41 is input to a time generation circuit 46 through an AND circuit 45. The time generation circuit 46 is triggered by the leading edge of the input signal to produce an output signal with a time width $t_4$. The output signal is input to the time generation circuit 34 through the OR circuit 37, whereby the registration rollers 16 are rotated in the same manner as mentioned previously. When the transfer sheet is of the full size, by the output signal from a full-size detection circuit 47 employing the switch SW2, the output signal of the flip-flop 41 is input to a time generation circuit 49 through an AND circuit 48, so that the time generation circuit 49 is triggered by the leading edge of the input signal to produce an output signal with a time width $t_2$. This output signal is input to the time generation circuit 38 through the OR circuit 37, whereby the rollers 16 are rotated in the same manner as mentioned above.

Figure 6:
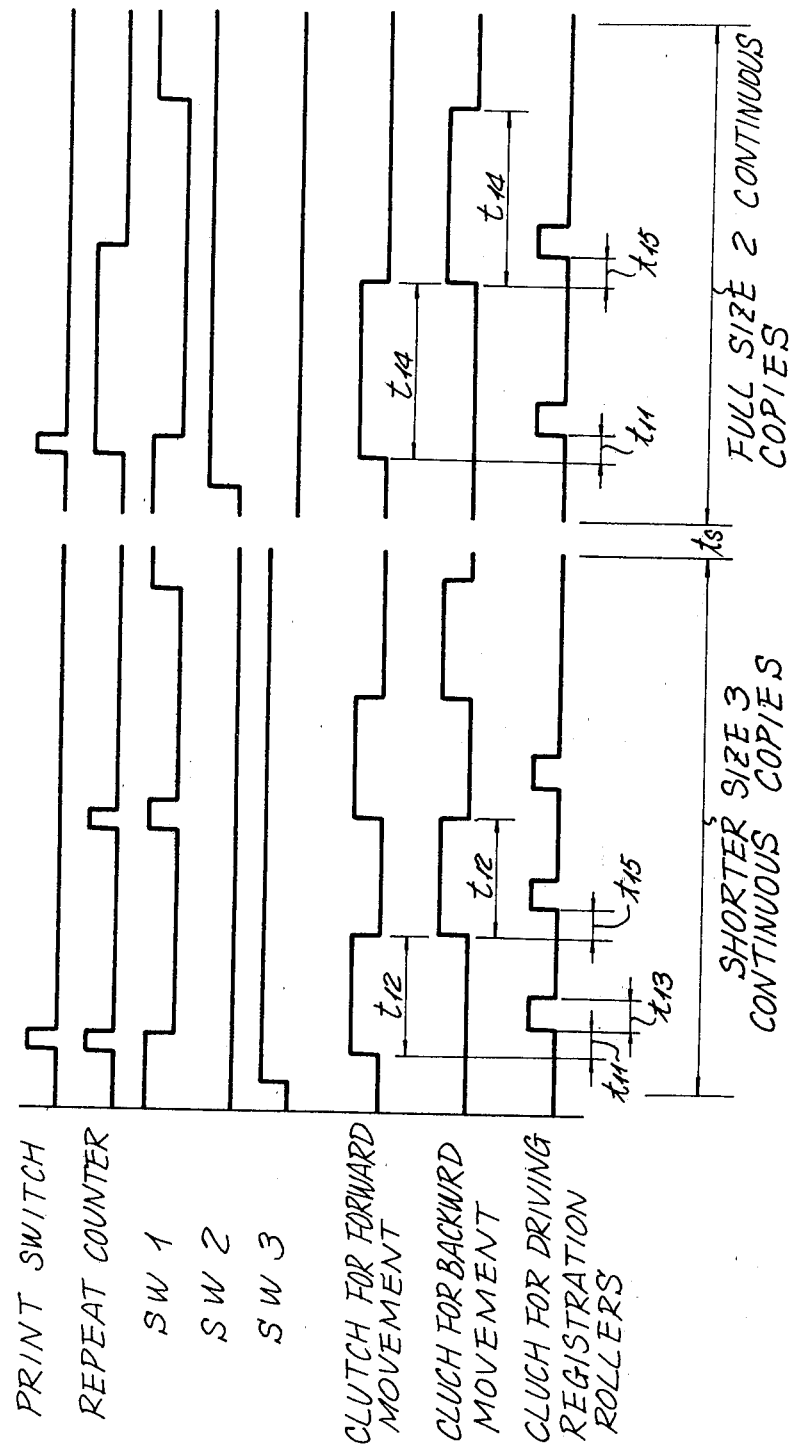
FIG. 6 is a timing chart showing another operation of the copying apparatus according to the invention shown in FIG. 3.

Referring to FIG. 6, there is shown a time chart in the case where from a half-size original, three half-size copies are successively made and within the period of time $t_s$, after that, the cassette is exchanged and the number of repeat copies is changed to 2, and two full-size copies are made from one full-size original.

Figure 7:
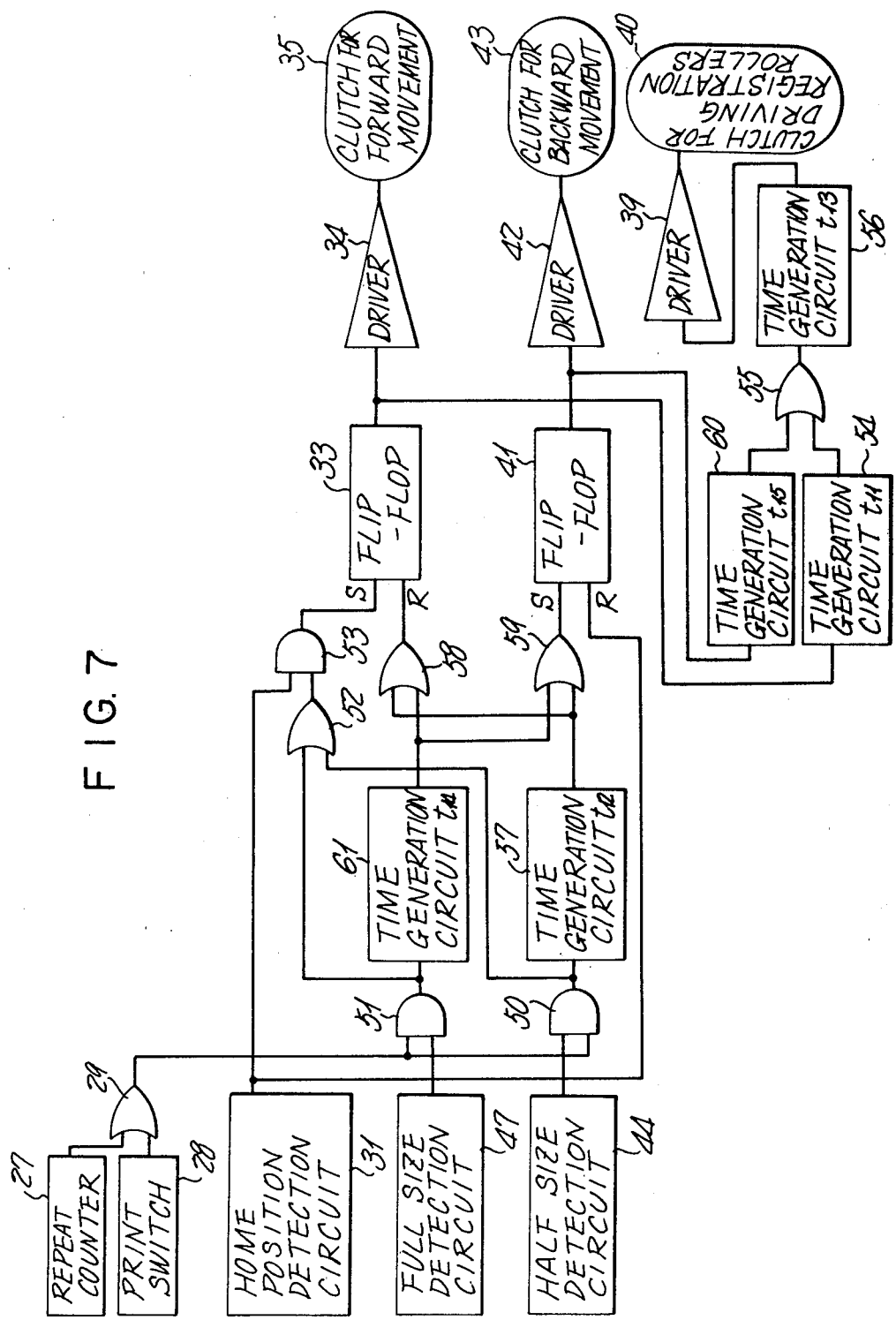
FIG. 7 is a block diagram of the electric circuit for performing the the operation shown in the timing chart in FIG. 6.

FIG. 7 shows an electric circuit for performing the operation shown in FIG. 6.

The output signals from the repeat counter 27 and from the print switch 28 are input to AND circuits 50 and 51 through the OR circuit 29. The output signals from a shorter size detection circuit 44 and from a full-size detection circuit 47 are respectively input to the AND circuit 50 and the AND circuit 51. The output signals of the AND circuits 50 and 51 are input to an AND circuit 53 through an OR circuit 52, and the output signal of the home position detection circuit 31 is also input to the AND circuit 53. The flip-flop 33 is set by the leading edge of the output signal of the AND circuit 53. The driver 34 drives the clutch 35 for the forward scanning by the output signal of the flip-flop 33, so that the optical system is moved forwards. A time generation circuit 54 is triggered by the leading edge of the output signal of the flip-flop 33 to produce an output signal with a time width $t_{11}$, and the output signal is input to a time generation circuit 56 through an OR circuit 55. The time generation circuit 56 is triggered by the trailing edge of the input signal to produce an output signal with a time width $t_{13}$. In accordance with this output signal, the driver 39 drives the clutch 40, so that the rollers 16 are rotated. When the transfer sheet is of a shorter size, a time generation circuit 57 is triggered by the leading edge of the output signal of the AND circuit 50 to produce an output signal with a time width $t_{12}$. This output signal is input to the flip-flop 33 through an OR circuit 58 as a reset signal for resetting the flip-flop 33, and, at the same time, that output signal is input to the flip-flop 41 through an OR circuit as a set signal for setting the flip-flop 41. The flip-flop 41 is set by the leading edge of the set signal and is reset by the leading edge of the output signal of the home position detection circuit 31. The driver 42 drives the clutch 43 for the backward scanning, so that the optical system is moved backwards. A time generation circuit 60 is triggered by the leading edge of the output signal of the flip-flop 41 to produce an output signal with a time width $t_{15}$. This output signal is input to the time generation circuit 56 through the OR circuit 55, so that the registration rollers 16 are rotated in the same manner as aforementioned. When the transfer sheet size is switched to the full size, a time generation circuit 61 is triggered by the trailing edge of the output signal of the AND circuit 51 to produce an output signal with a time width $t_{14}$. Instead of the output signal of the time generation circuit 57, that output signal is input to the flip-flop 33 through the OR circuit 58 as a reset signal for resetting the flip-flop 33 and, at the same time, is input to the flip-flop 41 through the OR circuit 59 as a set signal for setting the flip-flop 41.

The shorter size detection circuit 44 can be constructed of a sheet feed cassette detection switch and a transfer sheet size selector for selecting the size of transfer sheet to be disposed in the operation panel in the copying machine. The time generation circuit 57 can be designed so as to be capable of changing the time $t_{12}$ in accordance with each shorter size. The timing of the backward movement of the optical system can be controlled by the output signal of a switch disposed near the movement portion of the optical system, which switch is turned on and off by the cam plate 25, instead of using the time generation circuit 57. The time $t_4$, $t_5$, $t_{11}$ and $t_{15}$ includes the time corresponding to the shift distance of the image formation position on the photoconductor in the backward and forward movements of the optical system. However, where there is no shift, it can be considered that $t_{11} = t_{15}$.

In the explanation so far made, the time generation circuits are controlled by the scanning movement of the optical system, whereby the initiation of the feeding of the transfer sheet is changed. In other words, the timing of feeding the transfer sheets is changed in accordance with the shift of the image area on the photoconductor. However, since there is a relative relationship between the positioning of the image on the photoconductor and that of the transfer sheet, the timing of the formation of the image can be changed by making the timing of the feeding of the transfer sheet constant with respect to a predetermined position of the photoconductor. In this case, the scanning initiation of the optical system (in both the forward and the backward original scanning) is controlled in such a manner that the image is formed at a predetermined position on the photoconductor. Furthermore, the present invention can be applied not only to an indirect type copying apparatus but also to a direct type copying apparatus.

A method of adjusting the positional relationship between the copy image and the recording sheet in the transverse direction according to the invention will now be described.

As mentioned previously, the positional relationship between the copy image and the recording sheet in the recording position in the transverse direction can be done by moving the image formation lens system or the recording sheet in the transverse direction.

By using the example shown in FIGS. 2A and 2B, the movement of the image formation lens system and the recording sheet will now be explained, while referring to FIGS. 8 and 9.

Figure 8:
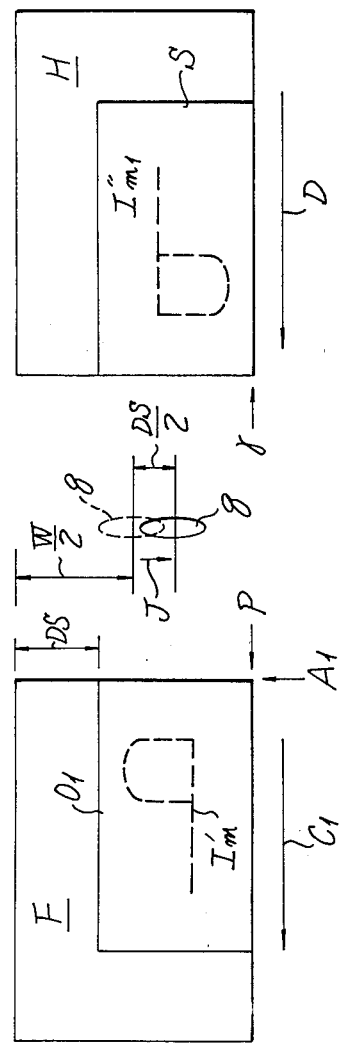
FIG. 8 is a diagram in explanation of the positional adjustment of a copy image and a recording sheet in the transverse direction thereof by moving an image formation lens system.

FIG. 8 shows a case where the above-mentioned positional relationship is adjusted by moving the image formation lens system. In the example shown in FIGS. 2A and 2B, the original $O_1$ is placed by one-side reference stacking, while the recording sheet S is transported by one-reference transfer and there is a positional shift between the copy image and the recording sheet during the forward original scanning. In other words, in this example, there is brought about a positional shift between the visible image $I'_{ml}$ and the recording sheet S. In order to adjust this shift by moving the image formation lens system 8, the image formation lens 8 is shifted in the transverse direction shown by arrow J, that is, towards the transportation reference side for the recording sheet transportation and therefore the position of the visible image formed is shifted to in the direction of the arrow J. The displacement of the lens system 8 is one half of the difference in width in the transverse direction between the maximum size original and the original $O_1$, that is DS/2.

Figure 9:
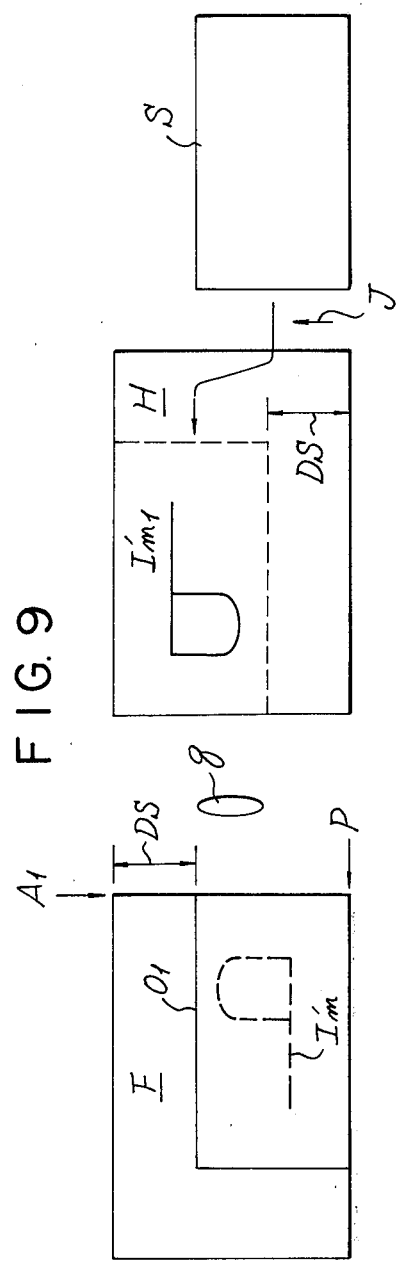
FIG. 9 is a diagram in explanation of the positional adjustment of a copy image and a recording sheet in the transverse direction thereof by the movement of the recording sheet in the transverse direction thereof.
Figure 10:
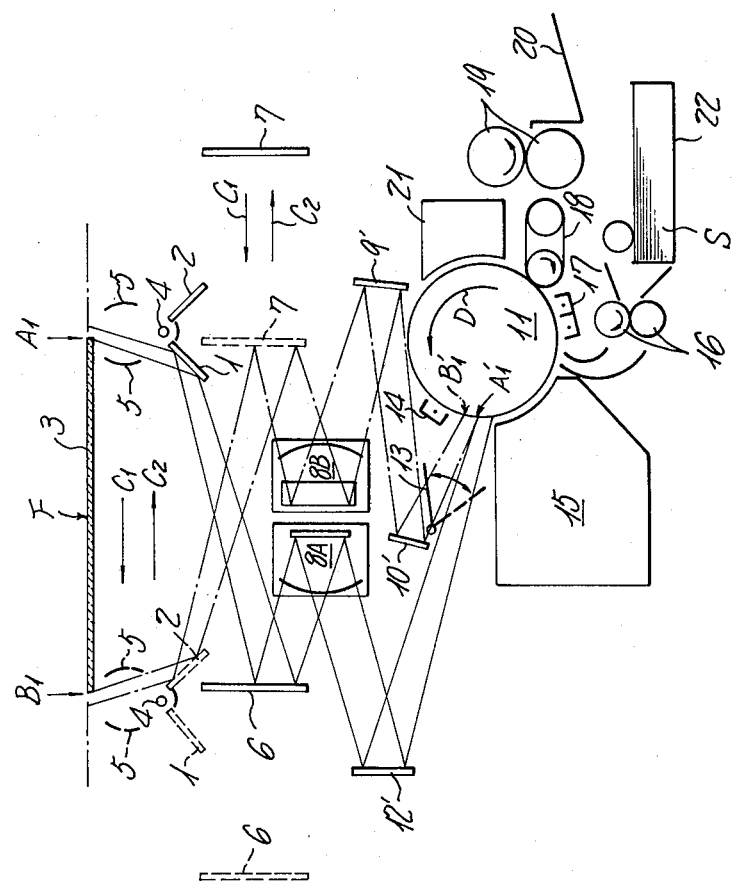
FIG. 10 is a diagrammatic sectional view of a copying apparatus to which the invention can be applied.

Referring to FIG. 9, there is shown the adjustment of the positional relationship by shifting the recording sheet S in the transverse direction. More specifically, in this method, the positional relationship in the transverse direction between the visible image $I'_{ml}$ and the recording sheet S is made proper by shifting the recording sheet S by a distance DS in the direction of arrow J' on its way from the cassette to the image transfer section, that is in the direction opposite to the shifting of the image formation lens system 8 in FIG. 8. The above-mentioned method will now be described more specifically by referring to a specific example shown in FIG. 10. In FIG. 10, for the sake of convenience of explanation, with respect to the members which may not cause any confusion, the same reference numerals as those employed in FIG. 3 are employed.

Reference numerals employed for the first time in FIG. 10 are as follows: Numerals 8A and 8B respectively designate an in-mirror lens and in-prism lens, which constitute an image formation lens system. Numerals 9', 10' and 12' designate each plane mirror. The lenses 8A and 8B, and mirrors 9', 10' and 12' are stationary in the copying machine.

The plane mirrors 1 and 6, in-mirror lens 8A and plane mirror 12 constitute the exposure optical path for the forward original scanning, while the plane mirrors 2 and 7, in-prism lens 8B and mirrors 9' and 10' constitute a roof-type exposure optical path for the backward original scanning. The edge of the in-prism lens 8B is parallel to the plane of FIG. 10.

The copying process is the same as that of the copying apparatus shown in FIG. 3.

In the copying apparatus shown in FIG. 10, the positional relationship in the transverse direction is adjusted by shifting the image formation lens system.

In the case where an original other than the maximum size original is placed, such an original is placed in accordance with the one-side reference original stacking mentioned previously. With respect to the stacking reference in the transverse direction, one side in the transverse direction of the original is set in conformity with the end portion of the original stacking surface F, which end portions is perpendicular to the plane of FIG. 10. Further, with respect to the longitudinal direction, one side of the original is positioned in conformity with the position shown by reference symbol $A_1$ in FIG. 10. The transfer sheet is transported by one-side reference transportation, using the reference on the front side in FIG. 10.

In FIG. 10 and other drawing figures similar to FIG. 10, the front side and the back side with respect to the transverse direction always mean the front or this side and the back side in the direction normal to the plane of the drawings.

In the apparatus shown in FIG. 10, it is only in the case of the forward original scanning that a shift in the transverse direction is formed between a visible image and a transfer sheet. Therefore, in order to correct such a shift, only the in-mirror lens 8A is shifted by a distance DS/2 to the front side in the transverse direction. The explanation that has been made with respect to FIG. 8 can be applied to this case. The image formation lens system 8 in FIG. 8 is constructed of a through-lens, but it does not make any substantial difference with respect to the adjustment of the positional relationship between a copy image and a recording sheet.

Figure 11:
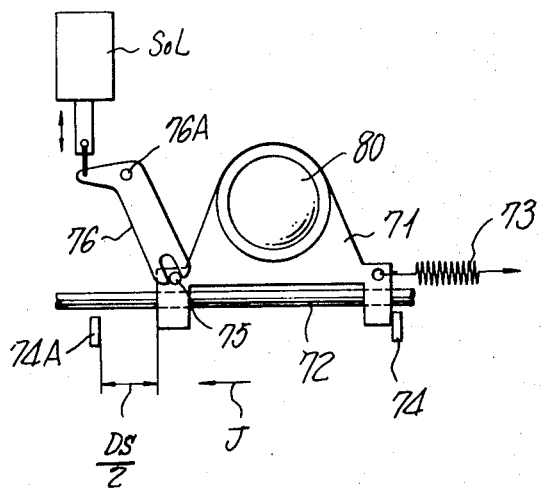
FIG. 11 is a plan view of a mechanism for moving an image formation lens system.
Figure 12:
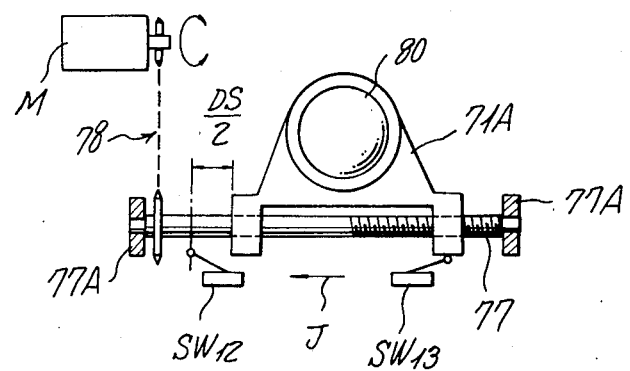
FIG. 12 is a plan view of another mechanism for moving the image formation lens system.

Two specific examples of a mechanism for shifting the image formation lens system will now be explained by referring to FIGS. 11 and 12. When the positional relationship between a copy image and a recording sheet is adjusted by shifting the image formation lens system, it is required that the lens system constituting an exposure optical path which is not of a roof type be shifted. The lens system shifted can be either an in-mirror lens or a through-lens. In FIGS. 11 and 12, the lens system is designated by reference numeral 80. The lens system 80 can be either an in-mirror lens or a through-lens as the case may be. Hereinafter, the lens system is simply referred to as the lens 80. It is assumed that small size originals other than the maximum size original are limited to the original $O_1$ (FIGS. 2A and 2B) and accordingly the displacement of the lens 80 is limited to DS/2.

Referring to FIG. 11, the lens 80 is securely mounted in a bracket 71 and is slidably supported on a guide shaft 72 through the bracket 71. The bracket 71 is connected to a fixed member (not shown) by a taut spring 73. By the spring 73, the lens 80 is urged to the right in FIG. 11. However, the lens 80 thus urged is stopped by the contact of the bracket 71 with a stopper 74. Under the condition that the bracket 71 is in contact with the stopper 74, the position of the lens 80 for copying the maximum size original is set.

A pin 75 is embedded in the bracket 71. A slot of a crank 76 pivotally mounted on a shaft 76A engages the pin 75. A solenoid SOL is connected to the crank 76. When copying the original $O_1$ (FIGS. 2A and 2B), the solenoid SOL is energized so that the crank 76 is rotated clockwise and at the same time the bracket 71 is shifted in the direction of the arrow J until it comes into contact with a stopper 74A, whereby the position of the lens 80 for copying the small original $O_1$ is set. In other words, with the energization of the solenoid SOL, the lens 80 is shifted by the distance DS/2, while maintaining the direction of its optical axis. When the solenoid SOL is deenergized, the lens 80 is moved by the spring 73 until the bracket 71 comes into contact with the stopper 74.

The switching of the energization of the solenoid SOL can be performed by manual operation of the operation panel or can be performed automatically when the transfer sheets are selected in accordance with the original if the lens 80 is an in-mirror lens as will be explained below.

The exchange of the small transfer sheet is automatically detected by the switches SW2 and SW3 or the like shown in FIG. 3, so that the solenoid SOL is energized. This is because when the lens 80 is an in-mirror lens, the shifting state of the in-mirror lens can be maintained during the copying of such a small original.

Referring to FIG. 12, there is shown another mechanism for shifting the image formation lens system. The lens 80 is fixed to a bracket 71A, and the bracket 71A is fitted in a screw shaft 77. The screw shaft 77 is pivotally supported on a bearing 77A. Furthermore, the screw shaft 77 is connected to a motor M through a transmission mechanism 78 comprising a sprocket and a belt. When the screw shaft 77 is rotated by the motor M, the bracket 71A is moved, whereby the lens 80 is shifted.

During the shifting of the lens 80, the direction of the optical axis of the lens 80 is maintained constant.

The shift of the in-mirror lens 80 is DS/2. This shift can be controlled by a switch SW12 and a switch SW13 and the aforementioned switch for detecting the exchange of the small size transfer sheets.

More specifically, the position of the lens 80 shown in FIG. 12 is for copying the maximum size original, but when a small size transfer sheet is detected by a switch (not shown) being turned on, the switch SW12 is also turned on, so that the motor M is energized and the bracket 71A and accordingly the lens 80 is moved in the direction of the arrow J. This movement is continued until the switch SW13 is turned on by the bracket 71A. When the switch SW13 is turned on, the lens 80 has been shifted by the distance DS/2 and stops, whereby the lens position for copying the small size original $O_1$ is set. When the transfer sheet is exchanged and a switch (not shown) is turned off, the motor M rotates reversely to move the bracket 71A until the switch SW12 is turned on.

In the above-mentioned example, two types of originals, a large size and a small size, can be handled by use of two types of transfer sheets corresponding to the originals. It is extremely easy to modify the example so as to be capable of handling three or more types of originals and it will be unnecessary to explain them all.

So far, the case has been explained where the relative shift of the recording sheet and the copy image in the transverse direction when making copies from the small size original is corrected by the shift or displacement of the image formation lens system.

A method of correcting the above-mentioned shift by shifting the recording sheet will now be explained by referring to a specific example.

Figure 13:
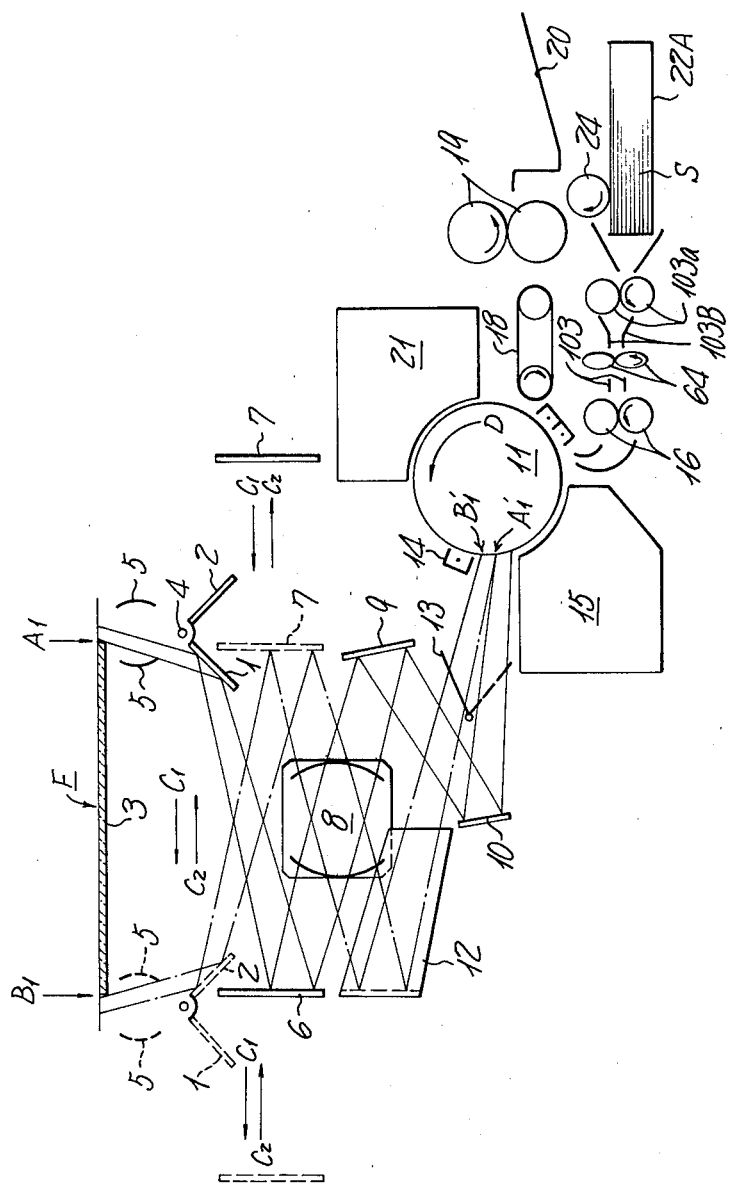
FIG. 13 is a diagrammatical sectional view of another embodiment of a copying apparatus according to the invention.

Referring to FIG. 13, there is shown another embodiment of a copying apparatus according to the invention, in which the method of correcting the above-mentioned shift of the copy image and a transfer sheet by shifting the transfer sheet is employed in the copying apparatus shown in FIG. 3.

In FIG. 13, reference numeral 103A designates transportation rollers which are disposed between the cassette 22A for holding small size transfer sheets and the registration rollers 16. Reference numeral 103B designates a guide; numeral 64 shifting rollers.

The shift of the transfer sheet and a copy image in the transverse direction takes place on the following occasions: (1) A small size original is placed with one-side reference stacking and a transfer sheet is transported with the center reference transportation. (2) A small size original is placed with the center reference stacking and a transfer sheet is transported with one-side reference transportation. (3) A small size original is placed with one-side reference stacking and a transfer sheet is transported with one-side reference transportation.

The case where a small size original is placed with the center reference stacking and a transfer sheet is transported with one-side reference transportation and the reference for transporting the transfer sheet is located on the front side in the transverse direction will now be explained. In this case, since the small size original is placed with the center reference stacking, the position of the visible image formed on the photoconductor 11 in the transverse direction is always located in the central portion in the transverse direction, regardless of the forward original scanning and the backward original scanning. Therefore, in order to transfer the visible image to the transfer sheet S at the proper position, the sheet S is shifted by the distance DS/2 to the back side in the transverse direction on the way of its transportation from the cassette 22A to the image transfer section. This shifting is shown in FIG. 14. The shifting DS/2 of the sheet S to the back side in the transverse direction is performed both at the forward and the backward original scanning. When the transportation reference for transporting the sheet S is set on the back side in the transverse direction, the shifting direction has to be reversed, by shifting to the front side by the distance DS/2.

In the case where a small size original is placed with one-side reference stacking and that reference is located on the front side in the transverse direction, and a transfer sheet is transported with one-side reference transportation, it is only during the forward original scanning when the visible image and the transfer sheet are shifted to each other in the transverse direction. Therefore, in this case, only the transfer sheet to which the visible image is transferred is selectively shifted by the distance DS/2 to the back side in the transverse direction. FIG. 9 shows such a case.

In the above-mentioned cases, a mechanism for shifting the transfer sheet in the transverse direction on the way of its transportation will be explained. Part of such a mechanism is shown as the shiting rollers in FIG. 15. The shifting rollers 64 are composed of a pair of rollers. One of the shifting rollers 64 will be explained for convenience of explanation. As shown in FIG. 15, the roller 64 is fixed to a shaft 130, with an inclination of an angle $\theta$ with respect to the transportation direction of the transfer sheet corresponding to the maximum size original. The shaft 130 is supported on a bearing 132, and part of the shaft 130 is connected to a transmission mechanism 133 through a flexible rotation shaft joint 131.

When the transportation of the sheet S is initiated with a portion $P_1$ on the front side in the transverse direction as the transportation reference, the sheet S is shifted to the back side in the transverse direction by the shifting rollers 64. When the sheet S reaches a guide plate 134 located on the back side, it is transported along the guide plate 134. The guide plate 134 is located in conformity with a reference $P_2$ on the back side in the transverse direction.

As mentioned previously, the shifting rollers 64 consists of a pair of rollers, and these rollers are detachable from each other. Only when there is a transfer sheet to be shifted, those rollers are brought into engagement with each other for shifting the transfer sheet. The detaching operation of the rollers 64 can be performed in accordance with the detection of the size of transfer sheet and in collaboration with the forward and backward movements of the optical system.

A method of shifting a transfer sheet when a small size original is placed with one-side reference stacking and a transfer sheet is transported with the center reference transportation will be explained.

Since the small size original is placed with one-side reference stacking, the visible image formed on the photoconductor is located on either the front side in the transverse direction or the back side in the transverse direction. When the original stacking reference is on the front side, the visible image formed by a roof type optical path is located on the front side. When the original stacking reference is located on the back side, the visible image formed by an exposure optical path which is not of a roof type is located on the front side.

When the original stacking reference is set on the front side, since the visible image formed by the forward original scanning is shifted to the back side in the transverse direction, the transfer sheet S is shifted to the back side by the distance DS/2 as shown in FIG. 16A. At the backward original scanning, the sheet S is shifted to the front side by the distance DS/2 as shown in FIG. 16B. In order to perform this in practice, a pair of shifting rollers which is similar in construction to the shifting rollers 64, but rotates in the reverse direction is additionally required. The above-mentioned shifting of the transfer sheet can be performed by alternately operating the two pairs of shifting rollers.

FIG. 17 shows another example of an optical path construction in a copying machine of the forward-backward exposure type. In FIG. 17, reference numerals 8A and 8C designate in-mirror lenses and numeral 12A designates a roof type mirror.

The relative shift of the visible image and the transfer sheet when making copies from a small size original can be corrected by shifting either in-mirror lens 8A or 8B, or both.

The method of correcting the shift by shifting a transfer sheet is not limited to the example shown in FIG. 13, but is applicable to the apparatuses as shown in FIGS. 10 and 11.

In the above description, the invention has been explained with respect to a copying process of a visible image transfer type. However, the invention can be applied to a copying process of an electrostatic latent image transfer type and to a direct copying process employing a photosensitive sheet. The relationship between the transfer sheet and the visible image or the electrostatic latent image in FIGS. 8, 9, 14 and 16 can be directly applied to the relationship between the photosensitive sheet and an exposure optical image.

Furthermore, it is conceivable that a recording sheet corresponding to the maximum size original is always employed regardless of the size of original. In this case, it never occurs that part of the original image is lacked in the copy, regardless of the size of original and the stacking position of the original. However, by applying the shift correction method by shifting the image formation lens system in the invention, the copy image can be located in the central portion of the recording sheet.

What is claimed is:

1. In a copying method of moving an original and an optical system relative to each other, while moving the surface of a photoconductor in a predetermined direction, and exposing said photoconductor to an optical image of said original through different exposure optical paths at the forward original scanning and at the backward original scanning by said optical system, the improvement wherein the timing of the transportation of a recording sheet to a recording position is changed at the forward original scanning and at the backward original scanning in relation with the relative shifting of said optical system and said original or the timing of said relative shifting of said optical system and said original is changed with respect to a predetermined timing of said transportation of the recording sheet at the forward original scanning and at the backward original scanning, in order to locate at a proper position on said recording sheet with respect to the longitudinal direction when copies are made from originals other than the maximum size original that can be copied.

2. A copying method as in claim 1, wherein the relative shifting of said original and said optical system is performed while setting said original stationarily at a predetermined position.

3. A copying method as in claim 1, wherein the relative shifting of said original and said optical system is performed while setting said optical system stationarily at a predetermined position.

4. A copying method as in claim 1, 2 or 3, wherein said copying method is of the type transferring an electrostatic latent image or a visible image from said photoconductor to a transfer sheet.

5. A copying method as in claim 1, 2 or 3, wherein said recording sheet is a photosensitive sheet and said copying method is of a direct copying type.

6. In an electrophotographic copying apparatus of a forward-and-backward exposure type in which a photoconductor is exposed to an optical image by moving an original and an optical system relative to each other for the forward scanning and backward scanning, the improvement wherein there is provided a recording position control means for controlling the relative positions of a recording sheet and a copy image in a recording position, depending upon the forward exposure scanning which is initiated from an original stacking reference position, and upon the backward exposure scanning which is initiated from a position opposite said original stacking reference position when copies smaller than the maximum size copy are made, and said recording position control means is selectively operated in conjunction with the forward and backward original scannings of said optical system.

7. An electrophotographic copying apparatus of a forward-and-backward exposure type as in claim 6, wherein said recording sheet is a transfer sheet and said recording position control means comprises a position detection means for detecting the relative position of said optical system to said original, a size detection means for detecting the size of said transfer sheet, and a delay means for delaying the initiation of the rotation of registration roller means for feeding said transfer sheet into said recording position at the backward original scanning.

8. In an electrophotographic copying apparatus of a forward-and-backward exposure type in which a photoconductor is exposed to an optical image by moving an original and an optical system relative to each other for the forward and the backward scanning, and an electrostatic latent image or a visible image is transferred from said photoconductor to a recording sheet, the improvement wherein there is provided a scanning initiation control means for controlling the distance from a scanning initiation position to an original exposure termination position so as to be substantially the same in the exposure which is initiated from an original stacking reference position, and in exposure which is initiated from a position opposite to said original stacking reference position when copies smaller than the maximum size copy are made.

9. In a copying method of moving an original and an optical system relative to each other, while moving the surface of a photoconductor in a predetermined direction, and exposing said photoconductor to an optical image of said original through different exposure optical paths at the forward original scanning and at the backward original scanning by said optical system, the improvement wherein an image formation lens system is shifted in the transverse direction by a predetermined distance while maintaining the direction of the optical axis of a lens of said image formation lens system or a recording sheet is shifted in the transverse direction by a predetermined distance on the way of the transportation thereof from a transportation initiation position to a recording position, in order to locate the copy image at a proper position on said recording sheet when copies are made from originals other than maximum size original.

10. A copying method as in claim 9, wherein the stacking of said original is always performed with the central portion in the transverse direction thereof as the original stacking reference, regardless of the size of original, and the transportation of the recording sheet corresponding to each original size is initiated with one side portion in the transverse direction as the transportation reference, and recording sheets other than the recording sheet corresponding to the maximum size original are shifted in the transverse direction by the distance corresponding to each size of the transfer sheet on the way of the transportation of the recording sheet to said recording position.

11. A copying method as in claim 9, wherein the stacking of said original is always performed with the central portion in the transverse direction thereof as the original stacking reference, regardless of the size of original, and the transportation of the recording sheet corresponding to each original size is initiated with one side portion in the transverse direction as the transportation reference, and recording sheets other than the recording sheet corresponding to the maximum size original are shifted in the transverse direction by the distance corresponding to each size of the transfer sheet on the way of the transportation of the recording sheet to said recording position, the direction of said shifting of the recording sheets being opposite at the forward original scanning and at the backward original scanning.

12. A copying method as in claim 9, wherein the stacking of said original is always performed with the central portion in the transverse direction thereof as the original stacking reference, regardless of the size of original, and the transportation of the recording sheet corresponding to each original size is initiated with one side portion in the transverse direction as the transportation reference, an exposure optical path for the forward original scanning has an in-mirror lens, and an exposure optical path for the backward original scanning has an in-prism lens or an in-mirror lens system, and a roof mirror, and one of said in-mirror lens and said in-mirror lens system is shifted in the transverse direction by the distance corresponding to the size of said original.

13. A copying method as in any one of claims 9 to 12 wherein the relative shifting of said original and said optical system is performed while setting said original stationarily at a predetermined position.

14. A copying method as in any one of claims 9 to 12 wherein the relative shifting of said original and said optical system is performed while setting said optical system stationarily at a predetermined position.

15. A copying method as in any one of claims 9 to 12, wherein said copying method is of the type transferring an electrostatic latent image or a visible image from said photoconductor to a transfer sheet.

16. A copying method as in any of claims 9 to 12, wherein said recording sheet is a photosensitive sheet and said copying method is of a direct copying type.

17. In a copying apparatus of the type of moving an original and an optical system relative to each other, while moving the surface of a photoconductor in a predetermined direction, and exposing said photoconductor to an optical image of said original through different exposure optical paths at the forward original scanning and at the backward original scanning by said optical system, the improvement wherein there is provided means for shifting an image formation lens system in the transverse direction by a predetermined distance while maintaining the direction of the optical axis of a lens of said image formation lens system in order to locate the copy image of said original at a proper position on said recording sheet with respect to the longitudinal direction when copies are made from originals other than the maximum size original that can be copied.

18. A copying apparatus as in claim 17, wherein said means for shifting said image formation lens system in the transverse direction by a predetermined distance comprises a bracket (71) for supporting said image formation lens system, a guide shaft (72) for slidably supporting said bracket (71), a spring means (73) for urging said bracket (71) in a predetermined direction, stoppers (74) and (74A) for limiting the movable range of said bracket (71), a crank (76) having a slot which engages a pin (75) securely embedded in said bracket (71), said crank (76) being pivotally supported on a shaft (76A) and a solenoid (SOL).

19. A copying apparatus as in claim 17, wherein said means for shifting said image formation lens system in transverse direction comprises a bracket (71A) for supporting said image formation lens system, a screw shaft (77) for supporting said bracket (71A), a bearing (77A) for pivotally supporting said screw shaft (77), a motor (M), a transmission mechanism (78) for transmitting the drive force of said motor (M) to said screw shaft (77), and switches (SW12, SW13) for determining the shift distance of said bracket (71A).

20. In a copying apparatus of the type of moving an original and an optical system relative to each other, while moving the surface of a photoconductor in a predetermined direction, and exposing said photoconductor to an optical image of said original through different exposure optical paths at the forward original scanning and at the backward original scanning by said optical system, the improvement wherein there is provided rollers (64) for shifting said recording sheet in the transverse direction by a predetermined distance on the way of the transportation of said recording sheet from the transportation initiation position to said recording position in order to locate the copy image of said original at a proper position on said recording sheet with respect to the longitudinal direction when copies are made from originals other than the maximum size original that can be copied.

21. A copying method as in claim 13, wherein said copying method is of the type transferring an electrostatic latent image or a visible image from said photoconductor to a transfer sheet.

22. A copying method as in claim 13, wherein said recording sheet is a photosensitive sheet and said copying method is of a direct copying type.

23. A copying method as in claim 14, wherein said copying method is of the type transferring an electrostatic latent image or a visible image from said photoconductor to a transfer sheet.

24. A copying method as in claim 14, wherein said recording sheet is a photosensitive sheet and said copying method is of a direct copying type.

* * * * *